United States Patent [19]

Holland et al.

[11] Patent Number: 5,046,914
[45] Date of Patent: Sep. 10, 1991

[54] PARALLEL LIFTING DEVICE

[75] Inventors: John M. Holland, Shawsville; Kenneth F. Kennedy, Roanoke, both of Va.

[73] Assignee: Cybermation, Inc., Roanoke, Va.

[21] Appl. No.: 609,016

[22] Filed: Oct. 23, 1990

Related U.S. Application Data

[63] Continuation of Ser. No. 218,094, Jul. 12, 1988, abandoned.

[51] Int. Cl.$^5$ .............................................. B66C 1/00
[52] U.S. Cl. ...................................... 414/706; 901/1; 901/15; 901/26; 414/680; 414/714
[58] Field of Search .......................... 901/1, 15, 25-27; 414/680, 685, 688, 700, 701, 706, 707, 714, 718, 735, 744.3

[56] References Cited

U.S. PATENT DOCUMENTS

| 3,937,339 | 2/1976 | Geis et al. | |
| 4,065,001 | 12/1977 | Ohnaka | 901/15 X |
| 4,396,344 | 8/1983 | Sugimoto et al. | |
| 4,531,884 | 7/1985 | Russell | 901/26 X |
| 4,586,868 | 5/1986 | Nakashima et al. | 414/735 |
| 4,601,635 | 7/1986 | Ito et al. | 901/15 X |
| 4,606,695 | 8/1986 | Lenz | 901/25 X |
| 4,632,630 | 12/1986 | Maki et al. | 414/700 |
| 4,645,408 | 2/1987 | Mizuno | |
| 4,662,814 | 5/1987 | Suzuki et al. | 901/15 X |
| 4,685,861 | 8/1987 | Huetsch | |
| 4,704,065 | 11/1987 | Allared | 414/735 |

FOREIGN PATENT DOCUMENTS 0073463  6/1977  Japan ..................................... 901/26

Primary Examiner—Frank E. Werner
Assistant Examiner—James Ellen
Attorney, Agent, or Firm—Ware, Fressola, Van der Sluys & Adolphson

[57] ABSTRACT

A lifting device incorporating first and second arm assemblies with associated rotatable shafts and a platform rotationally connected to the second arm assembly so as to maintain a fixed relationship to a reference surface as the first and second arm assemblies are angularly moved from one position to another. The shaft associated with the first arm assembly is rotated about its axis as the first arm assembly is angularly moved so as to impart similar angular movement to the platform through a rotatable shaft of the second arm assembly; thereby maintaining the platform's fixed relationship to a reference surface. A second embodiment of the lifting device provides an additional device to adjust the angular orientation of the platform with respect to the reference surface, which allows the platform to be maintained in a level orientation when traversing an inclined reference surface.

15 Claims, 7 Drawing Sheets

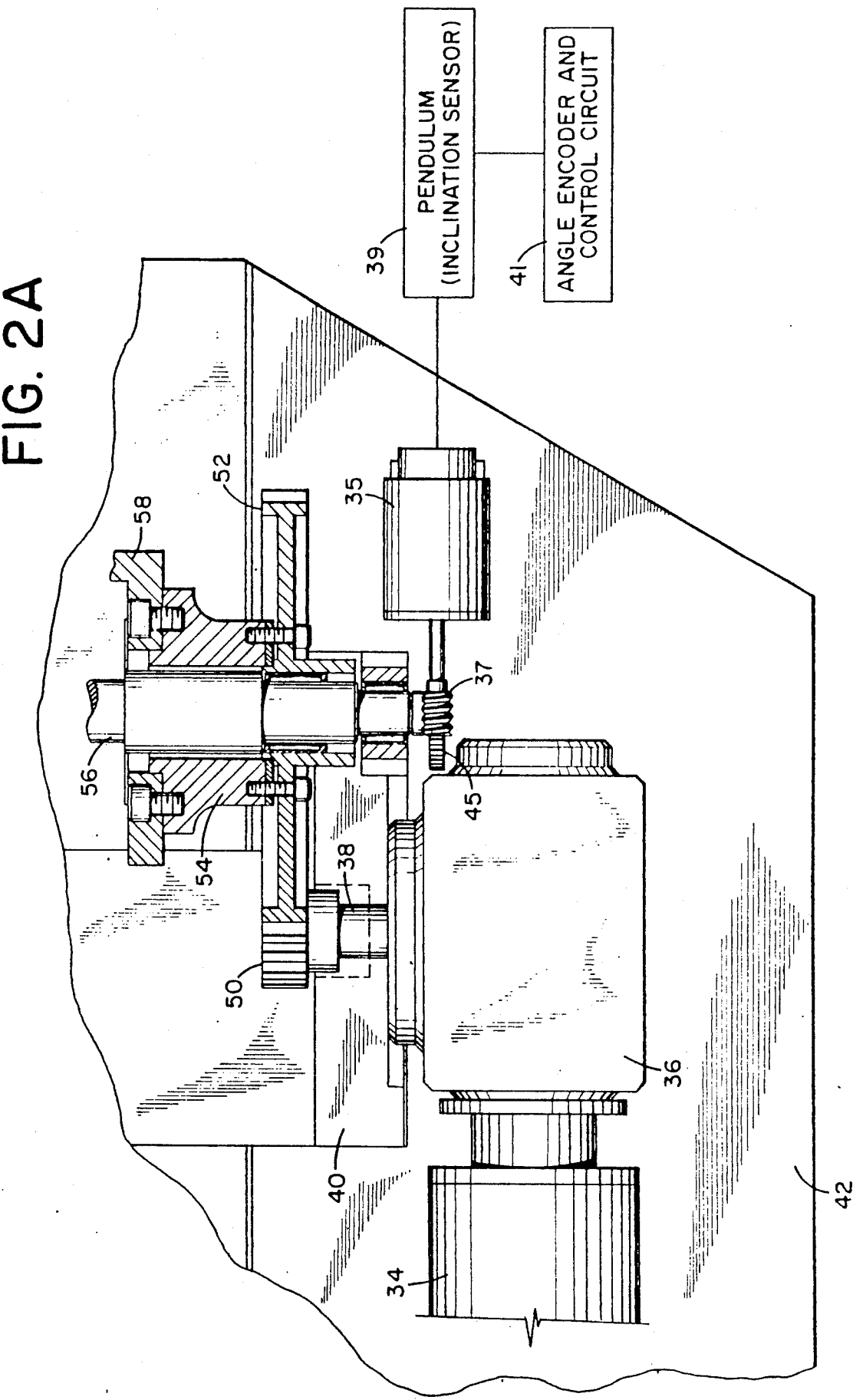

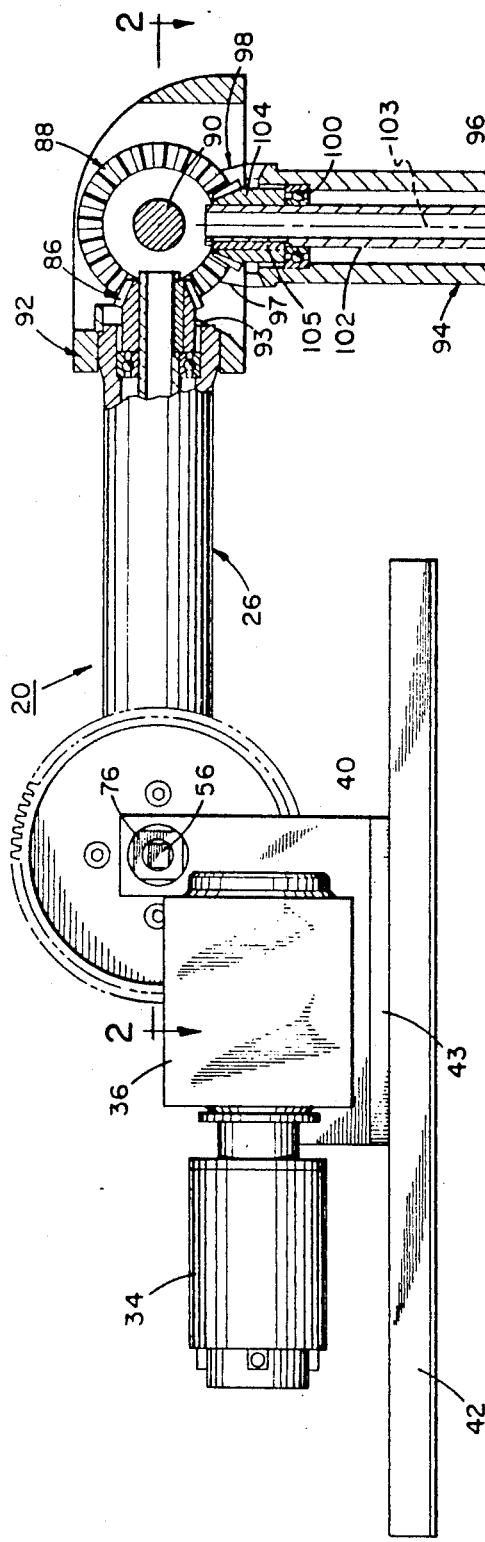
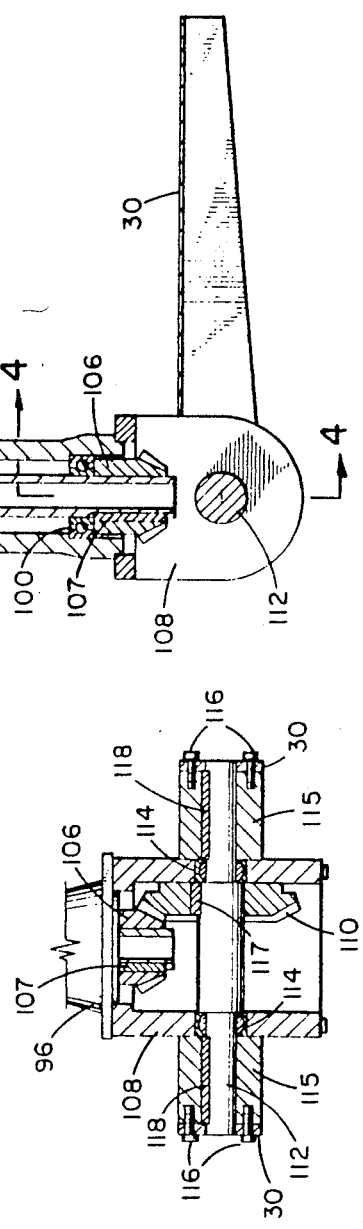
FIG. 3
FIG. 4

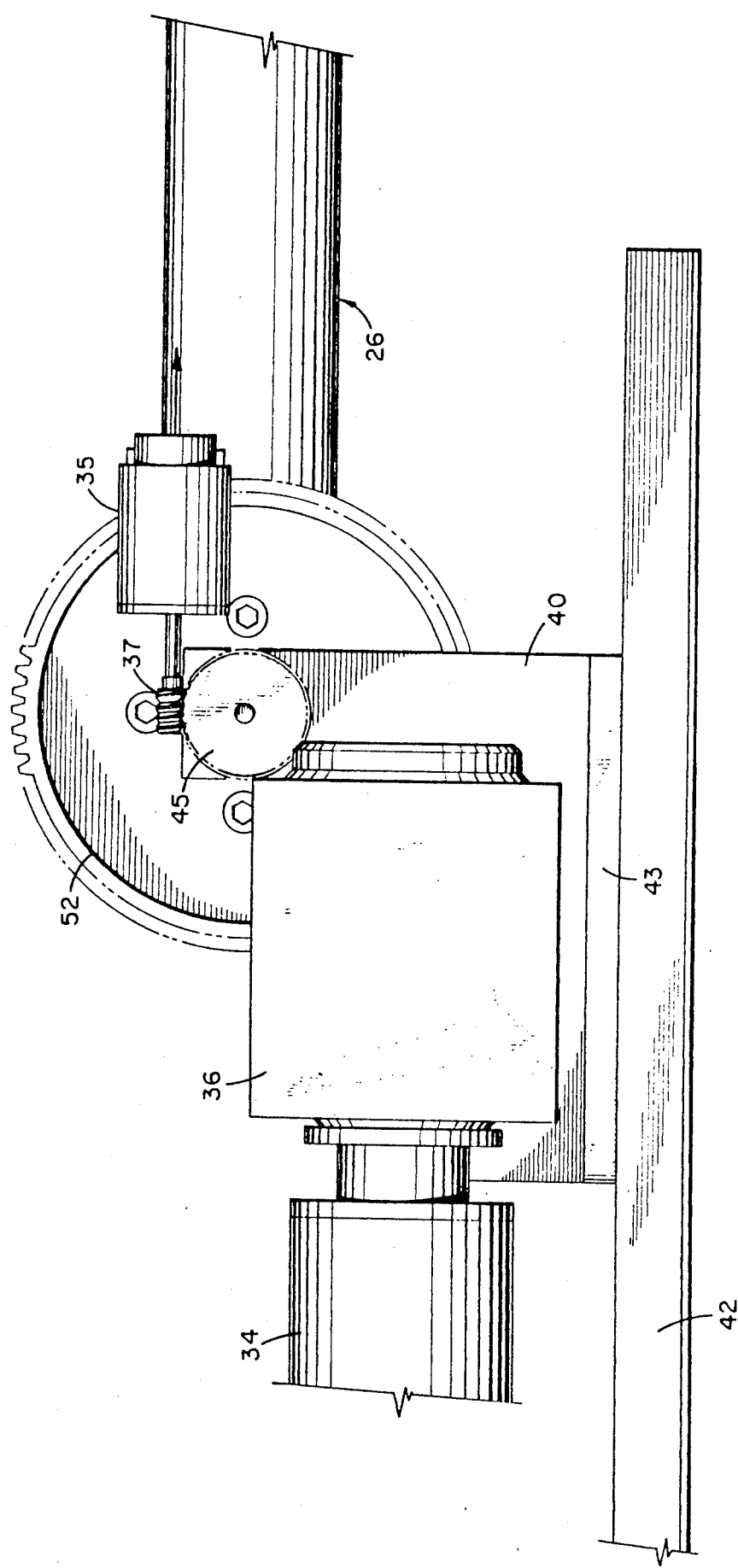

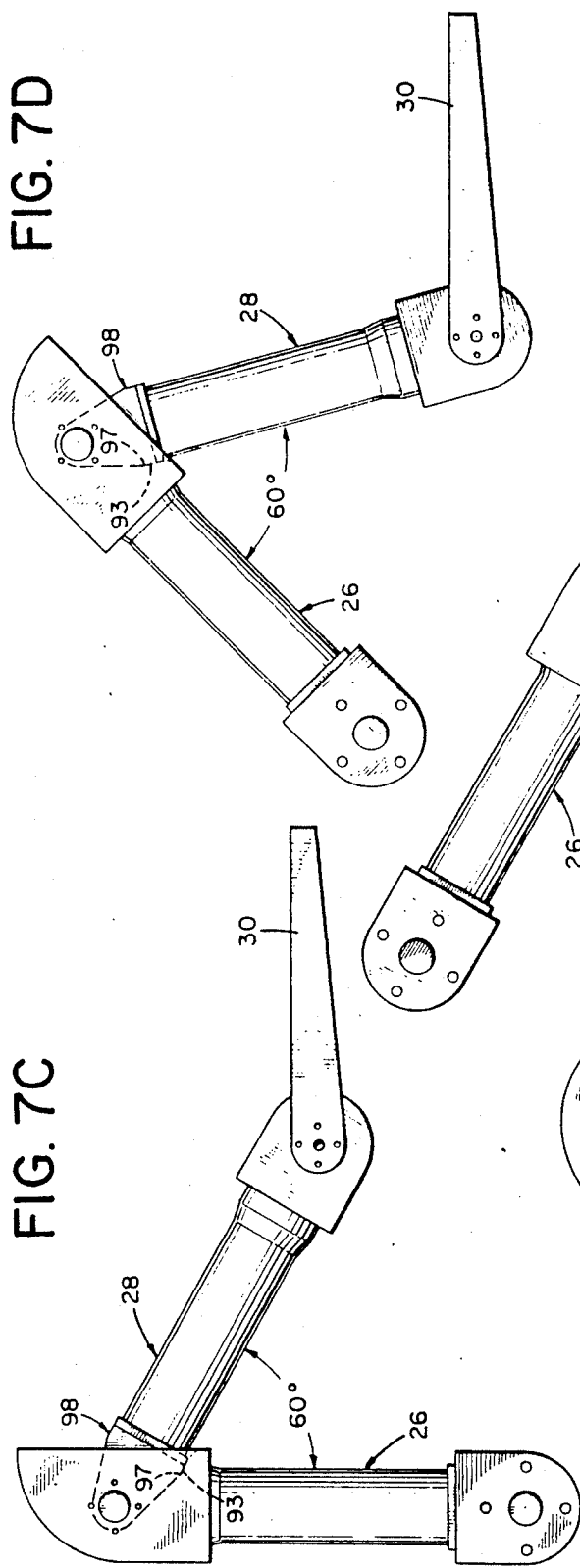
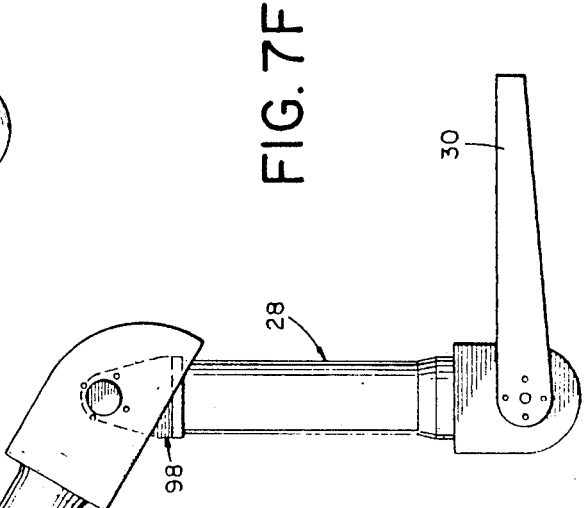
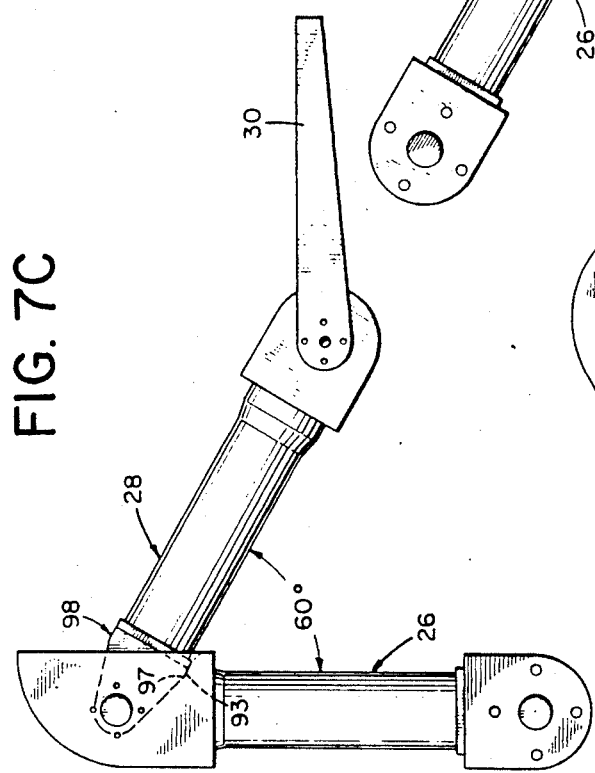
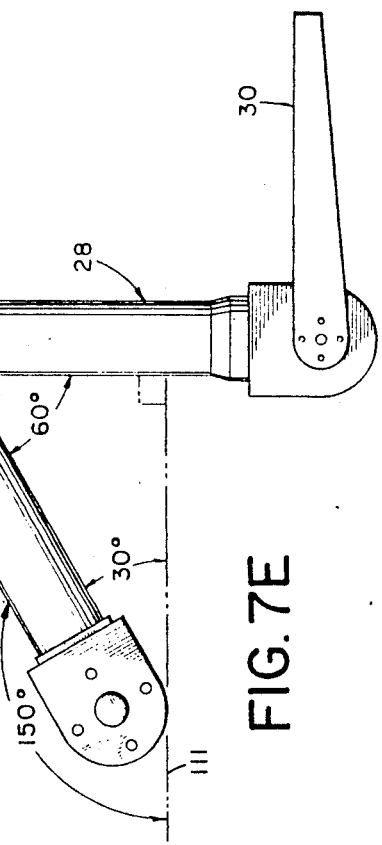

PARALLEL LIFTING DEVICE

This is a continuation of copending application Ser. No. 07/218,094, filed on July 12, 1988, now abandoned.

TECHNICAL FIELD

The present invention relates to lifting devices and particularly to lifting devices associated with mobile bases including mobile robots, automatic guided vehicles and autonomous vehicles.

BACKGROUND ART

Lifting devices associated with machinery including fixed location machinery as well as mobile machinery have existed for many years. Representative lifting devices are shown in U.S. Pat. Nos. 3,936,339, Geis, et al, 4,396,334, Sugimoto, et al, 4,645,408, Mizuno, and 4,685,861, Huetsch.

The Geis, et al patent shows a vehicle with forks 13 forming a platform which can be raised and lowered. The angular relationship of these forks to the ground is adjusted by means of hydraulic cylinders 12. This patent shows a platform lifting device which may maintain a parallel relationship to the ground, but requires adjustment of the hydraulic cylinder to maintain any particular angular relationship between the platform and the ground surface.

The present invention in a first embodiment provides a lifting device which automatically maintains a constant (typically parallel) relationship between the platform and the surface which the mobile base contacts.

Typically, the lifting device is mounted to a mobile base so that the plane of the platform is parallel to the surface upon which the mobile base rests. In this way, the present invention is able to maintain a parallel relationship between the platform and the surface upon which the mobile base contacts throughout the entire articulated movement of the lifting device.

In another embodiment, this constant relationship can be altered so as to allow the platform to be angularly articulated with respect to the surface contacting the mobile base. In this embodiment, the platform can be maintained in a level orientation so as to allow the platform to hold open fluid vessels or other objects level as the mobile base moves over sloped surfaces. This embodiment also allows for angular articulation of the platform so as to facilitate lifting and releasing objects such as pallets without translation of the platform or mobile base.

The present lifting device does not use nor require pneumatic control of the platform, but rather uses two arm assemblies with associated gears and shafts so as to automatically adjust the platform throughout the entire articulated movement of the lifting device. The arm assemblies also interact with each other so as to allow placement of the platform over the mobile base when the lifting device is in a home position and to extend the platform outward from the mobile base as the platform is moved to a lower extended position.

U.S. Pat. No. 4,396,344, Sugimoto, et al shows a pick and place type industrial robot having a forearm 22 with pivotal movement as shown in FIGS. 5, 6 and 7 thereof. Although a fixed orientation is maintainable between wrist 33 and the surface upon which the industrial robot is mounted, it maintains a desired orientation through means of either linking bars 47 (see FIGS. 9A and 9B thereof) or rotatable discs 41a and 41b as shown in the embodiment shown in FIGS. 10A and 10B. This reference also does not show or suggest a lifting device with two arm assemblies in combination with means for altering the angle of the platform so as to maintain the platform level while the mobile base moves over inclined surfaces, or at other times when such angular articulation is desired.

Also shown in the Sugimoto, et al patent are various prior art lifting devices, (see FIGS. 1 through 4), none of which suggest the use of arm assemblies with associated gears and shafts for maintaining a fixed angular relationship between a platform and the surface upon which a mobile base is placed.

The Mizuno patent illustrates a robot hand having a linkage system including an endless chain and a correction lever so as to compensate for uncontrolled angular displacement of the robot hand resulting from expansion or contraction of the robot hand shifting linkage. This reference does not disclose or suggest use of arm assemblies with associated gears and shafts as disclosed in the present invention for maintaining a given angular relationship between a platform and the surface upon which a mobile base is placed regardless of the articulated movement of the lifting device. It also does not show or suggest the angular articulation of the platform using such arm assemblies so as to maintain the platform level over an inclined surface.

Finally, the Huetsch patent discloses an industrial robot having mechanical links of a shoulder, arm and hand, joined in series with a waist joint, shoulder joint, wrist roll joint, and wrist pivot joint as well as a clutch mechanism associated with each joint. Although shafts and gears are used to drive the various joints, no suggestion is made of arm assemblies with associated gears and shafts so as to maintain a platform in a fixed angular relationship to the surface upon which the device is mounted throughout the entire articulated movement of the lifting device, nor of angular articulation of platform with respect to an inclined surface so as to maintain the platform level while the mobile base travels over such surfaces.

Other prior art are lifting forks associated with fork-lift type vehicles. Although such lifting forks maintain a parallel relationship with the floor surface upon which the fork-lift contacts, they do not maintain a parallel relationship to the floor surface by means of arm assemblies with associated gears and shafts. Indeed, the motion of such lifting-forks is typically in a vertical plane only, unlike the present invention wherein the articulated movement of the device encompasses two-dimensional movement of the platform.

Finally, the platforms associated with various work platforms used in industrial environments are typically hydraulically controlled and do not suggest use of two arm assemblies with associated gears and shafts for maintaining a fixed angular relationship between the platform and the surface upon which an associated mobile base is placed.

The present lifting device comprises first and second arm assemblies with associated gears and shafts and three joining members. The first arm assembly is pivotally mounted to the base plate of the mobile base and is capable of being angularly rotated from a home position wherein the platform is positioned over the mobile base to a lower extended position wherein the platform is positioned away from the mobile base. Throughout the articulated movement between the home position and the extended lower position, a parallel relationship is maintained between the platform and the surface upon which the mobile base is placed. The shafts associated with the first and second arm assemblies are rotated by the gears throughout this articulated movement in a manner so as to maintain this parallel relationship of the platform. Furthermore, the angular relationship between the first and second arm assemblies is restricted so that when this angle equals a predetermined value, the two arm assemblies contact each other. Such contact allows the platform to be placed over the mobile base when the lifting device is in the home position. None of these structural features are found or suggested by the prior art.

The second embodiment of the present invention incorporates a motor driven worm and gear so as to adjust the angular orientation of the platform without simultaneous movement of the arm assemblies. The worm can be interfaced to an inclination sensing device, such as a damped pendulum, to thereby adjust the angular orientation of the platform and maintain it level as the mobile base traverses an inclined surface.

The end result is a lifting device which is particularly adapted for use on mobile bases so as to provide the means for loading and unloading objects on the platform in an efficient and straightforward manner. By placing the platform over the mobile base, the lifting device also facilitates movement of loads by maintaining a combined stable center of gravity.

SUMMARY OF THE INVENTION

The present invention is a lifting device particularly adapted for attachment to a mobile platform so as to lift loads on and off an associated platform while maintaining the platform in a parallel relationship with respect to the surface upon which the mobile base is placed or in a level orientation with respect to the earth or other space-time accelerated reference frame within which the mobile base is placed. The lifting device is capable of movement from a home position wherein the platform is positioned above the mobile base to any of a continuum of positions wherein the platform is located away from the home position, including positions wherein the platform extends beyond the perimeter of the mobile base. Such positions include placement of the platform either above or below the base plate of the mobile base. In all of these positions, the platform is maintained in its parallel relationship to the surface upon which the mobile base is placed.

The lifting device achieves this result through a unique construction incorporating first and second arm assemblies, each having a shaft which rotationally cooperates with the other by means of interconnecting gears. The first arm assembly terminates at one end in a yoke which is mounted to a spur gear. The spur gear is driven so as to pivot the arm assembly about a shaft mounted to the mobile base. The first and second arm assemblies are free to pivot with respect to each other if the angle subtended between them is greater than a minimum angle. At this minimum angle the two arm assemblies contact each other. This minimum angle is maintained while the first arm assembly rotates about the base mounted shaft from the home position to an angle of approximately 150 degrees with respect to the mobile base (zero degree datum point where the arm is horizontal with respect to the base plate).

Due to this interaction between the two arm assemblies and further in view of the fact that the shafts associated with each arm assembly rotate with respect to each other as the first arm assembly is pivoted about the base mounted shaft, the platform is maintained in a fixed angular orientation with respect to the surface upon which the mobile base is placed.

This constant angular orientation of the platform is accomplished through use of a bevel gear affixed to the base mounted shaft. The shaft of the first arm assembly is rotated by this bevel gear as the first arm assembly is angularly displaced about the base mounted shafts. The first arm assembly shaft imparts a similar rotational movement to the second arm assembly shaft through a gear interface with the other end of the second arm assembly shaft imparting an angular displacement to the platform equal to the amount of angular displacement of the first arm assembly.

The lifting device further incorporates angular encoders, and a pair of cams and limit switches so as to terminate angular rotation of the first arm assembly at predetermined angular positions corresponding to the home position and the lower extended position.

By combination of the rotatable shafts maintaining the angular orientation of the platform with respect to the mobile base and surface upon which the mobile base is placed and the interaction of the first and second arm assemblies as the first arm assembly is angularly displaced from its home position to its lower extended position, a load may be easily placed on the platform or removed from the platform and may further be positioned over the mobile base during movement of the mobile base from one location to another.

A second embodiment of the invention further incorporates a worm and gear to rotate the base mounted shaft so as to be able to change the angular orientation of the platform to the surface upon which the mobile base is placed. This embodiment incorporates an inclination sensing device so as to allow the platform to be maintained in a level orientation when the mobile base traverses an inclined surface. Tilting of the platform can also be used to facilitate loading and unloading objects on the platform.

OBJECTS OF THE INVENTION

It is therefore of the principal object of the present invention to provide a lifting device particularly suited for use in conjunction with a mobile base incorporating first and second arm assemblies with associated rotatable shafts which can maintain the angular orientation of an associated platform throughout angular displacement of the first arm assembly from a first home position to a second lower extended position.

Another object of the present invention is to provide a lifting device of the above description further incorporating interaction between the first and second arm assemblies when these arms are at a predetermined angular configuration so as to facilitate placement of the platform over the mobile base when the first arm assembly is at its home position, which in turn facilitates movement of the mobile base when a load is on the platform.

A still further object of the present invention is to provide a lifting device of the above description further incorporating angular encoders, cams and limit switches for sensing the angular movement of the first arm assembly so as to limit such movement when that movement equals first and second predetermined angular displacements.

An additional object of the present invention is to provide a lifting device of the above description which incorporates means for adjusting the angular orientation of the platform so as to maintain the platform level as the mobile base traverses an inclined surface.

Another object of the present invention is to provide a lifting device of the above description which can adjust the angular orientation of the platform without required angular movement of the first and second arm assemblies so as to facilitate loading and unloading objects therefrom.

Other objects of the present invention will in part be obvious and will in part appear hereinafter.

BRIEF DESCRIPTION OF THE DRAWINGS

For a fuller understanding of the nature and objects of the present invention, reference should be made to the following detailed description taken in combination with the accompanying drawings, in which:

FIG. 2A is a partial top plan view of a second embodiment of the lifting device shown in FIG. 2, showing the motor, worm, worm gear, inclination sensor, angle encoder and control circuit to adjust the base mounted shaft, which otherwise is fixed, so as to in turn adjust the platform. The platform may be adjusted so as to maintain a level orientation when the mobile base traverses an inclined surface.

FIG. 3 is a side elevational view of the lifting device and the upper portion of the mobile base upon which it is pivotally installed, including a cross-sectional view of the second arm assembly taken along line 3—3 of FIG. 2.

FIG. 3A is a partial side elevational view of the second embodiment of the lifting device shown in FIG. 2A.

FIG. 4 is a cross-sectional view of the yoke connected at the lower termination of the second arm assembly, taken along line 4—4 of FIG. 3.

FIGS. 7A through 7F are each side elevational views of the lifting device showing various positions between and including the home position wherein the platform is positioned over the mobile base (FIGS. 7A) through the platform's lowermost extended position (FIG. 7F). FIG. 7E shows the angular relationship of the first and second arm assemblies when the minimum angular distance between the two arm assemblies is encountered.

BEST MODE FOR CARRYING OUT THE INVENTION

Figure 1:
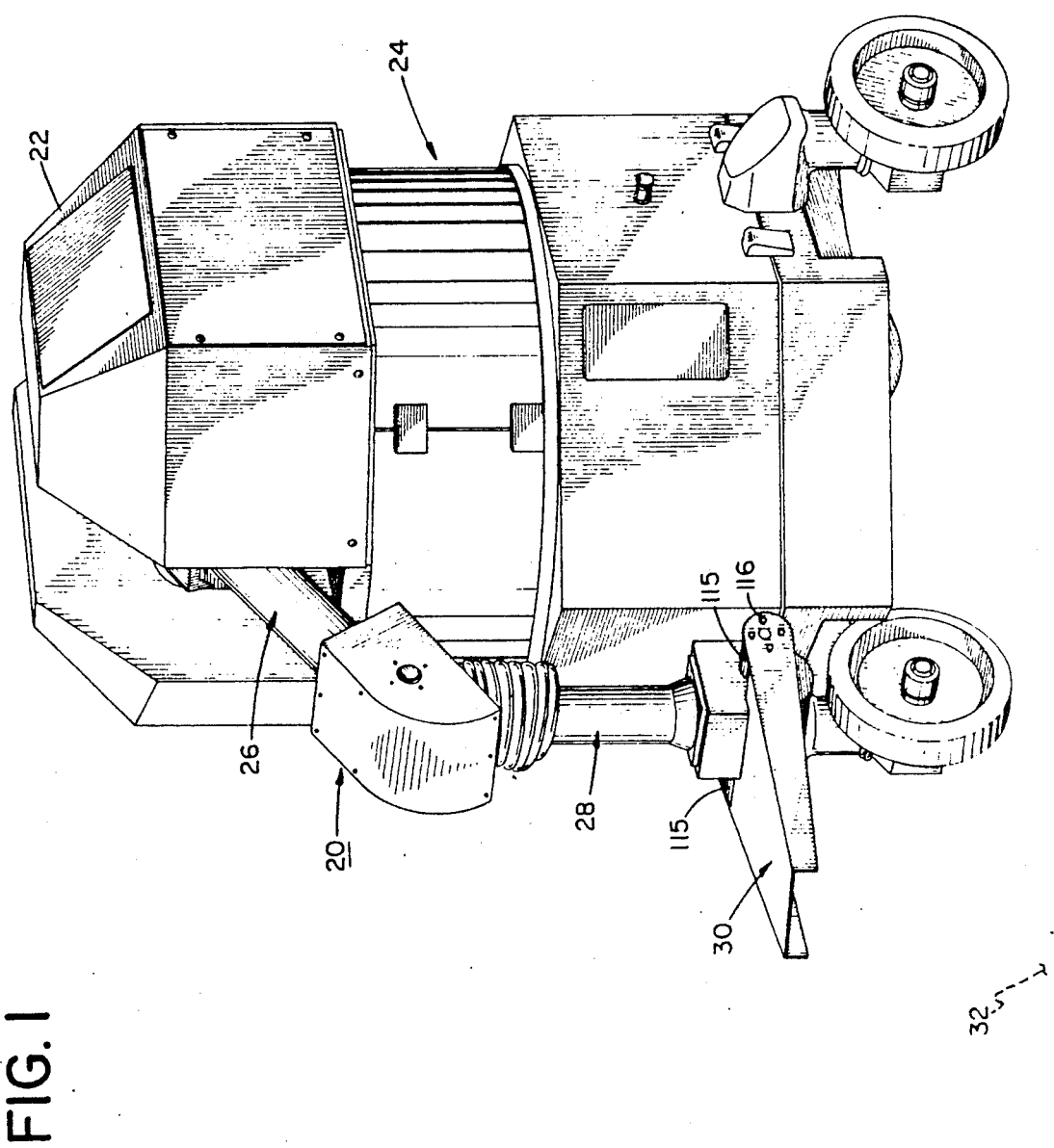
FIG. 1 is a perspective view of a mobile base and the lifting device according to the present invention showing the lifting device in its lower extended position.
Figure 6:
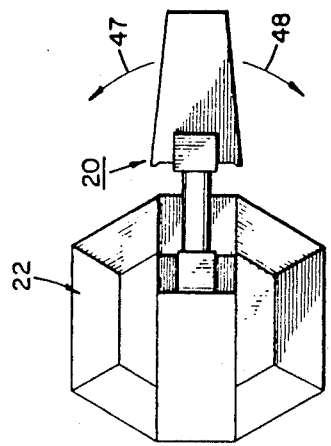
FIG. 6 is a top plan view of the mobile base and lifting device.
Figure 5:
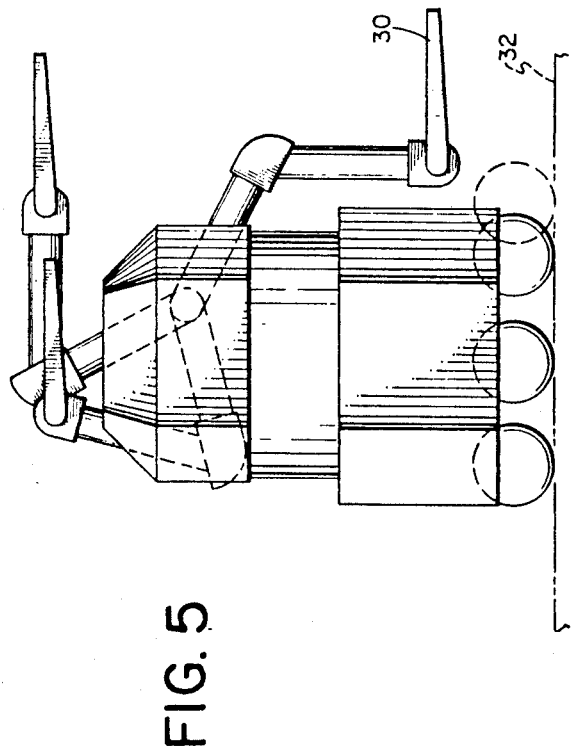
FIG. 5 is a side elevational view of the mobile base and lifting device shown in FIG. 1, illustrating partially in phantom, several positions of the lifting device, including the home position wherein the platform is positioned over the mobile base and the lower extended position in which the platform is positioned at its lowermost position forward of the mobile base.

As seen in FIGS. 1, 5 and 6, a lifting device 20 is preferably mounted to a rotatable turret 22 of a mobile base 24. The mobile base shown in FIG. 1 corresponds to applicant's K2A ™ Mobile Base as illustrated in assignee's U.S. Pat. No. 4,657,104, which is hereby incorporated by reference.

Figure 7B:
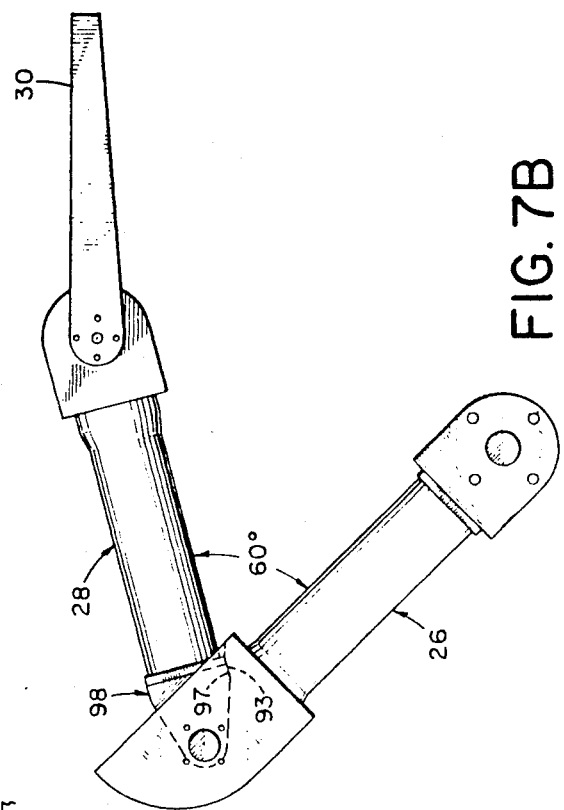
Figure 7A:
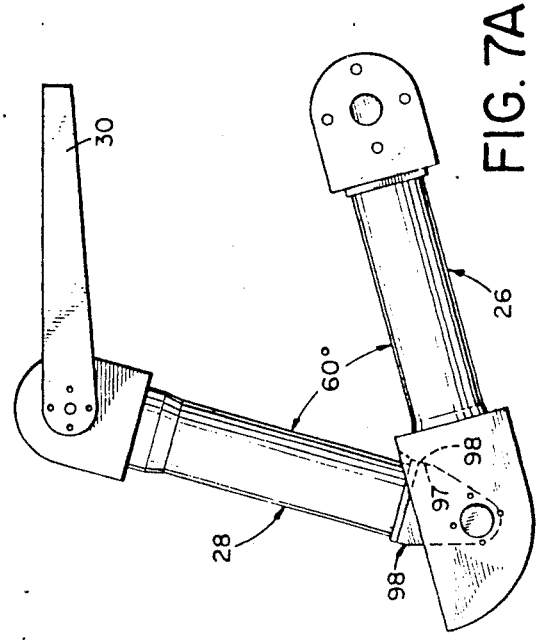

As seen in FIGS. 1, 5 and 7A-7F, the lifting device includes a first arm assembly 26, a second arm assembly 28 and a platform 30 having a flat planar surface for supporting objects to be placed thereon (objects not shown). As shown in these figures, the lifting device can be angularly displaced throughout a continuum of positions. One such position is a home position that is shown in FIGS. 5 and 7A, wherein the platform is positioned above the mobile base. Another position at the maximum clockwise displacement of arm assembly 26 (as viewed from the orientation of FIG. 5) is a lower extended position. This position is also shown in FIGS. 5 and 7F, wherein the platform extends away from the mobile base and at its lowermost position with respect to the mobile base.

The platform at these two end positions as well as all intermediate positions including those shown in FIGS. 7B-7E maintains a fixed angular orientation with respect to the mobile base and thus to the surface 32 of which the mobile base is positioned. As shown in FIG. 3 and 7A-7F, the fixed angular orientation occurs as a result of surface 93 of yoke 92 contacting surface 97 of yoke 98.

Figure 2:
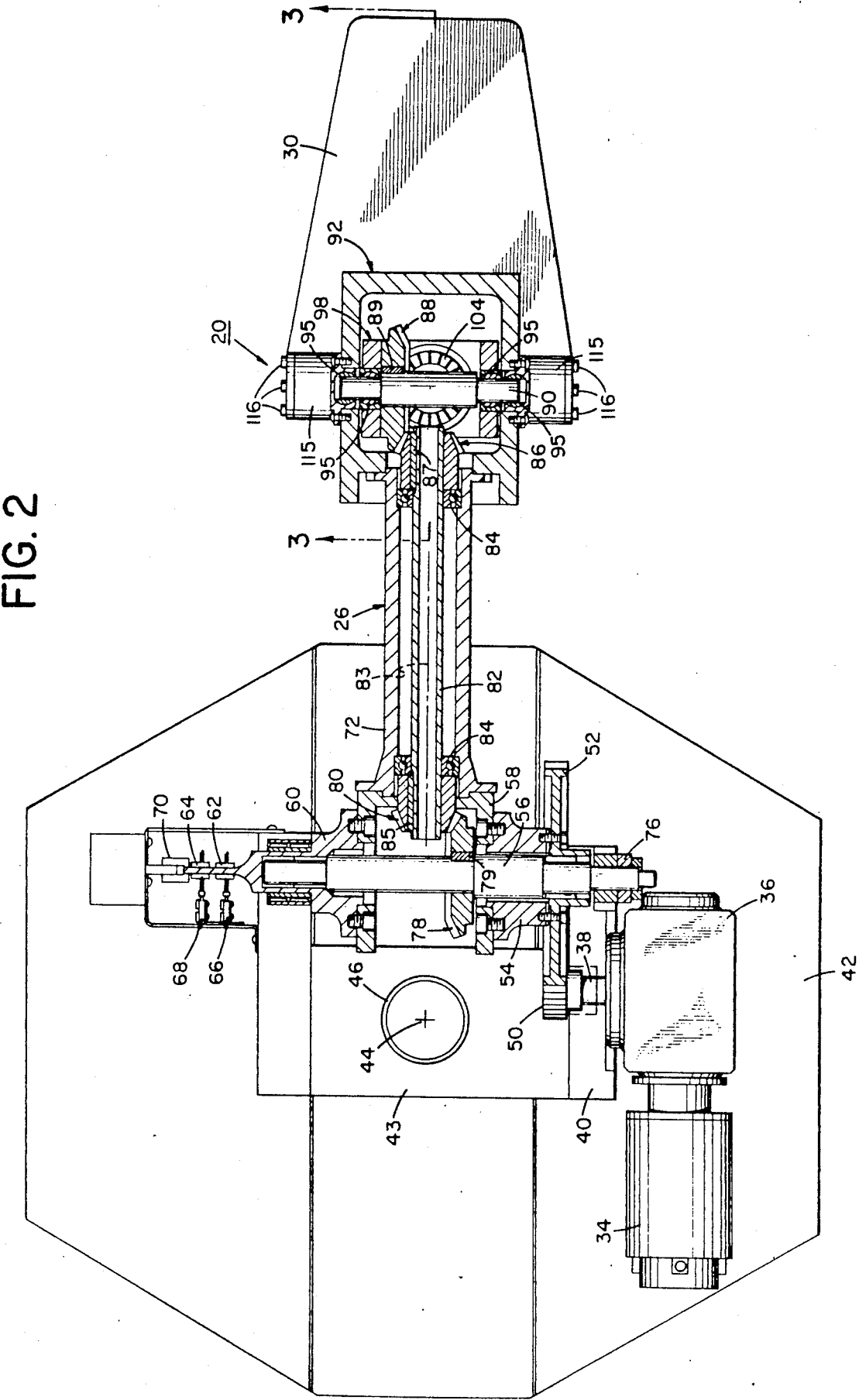
FIG. 2 is a top plan view of the lifting device and mobile base shown in FIG. 1, showing the lifting device in its lower extended position, the view taken cross-sectionally through the first arm assembly of the lifting device along line 2—2 of FIG. 3.

As best seen in FIGS. 2 and 3, the lifting device 20 incorporates an electric motor 34 which drives a worm gear reduction unit 36 so as to yield a fifty to one (50:1) reduction ratio at output shaft 38. Both motor 34 and reduction unit 36 are affixed to mounting support 40 which in turn is attached to mounting plate 43. Mounting plate 43 is mounted to base plate 42 by turret shaft 46 so as to be pivotable about axis 44.

As seen in FIGS. 1 and 6, the entire lifting device 20 in association with turret 22 can be turned by rotation of turret shaft 46 as shown by directional arrows 47 and 48.

Referring again to FIGS. 2 and 3, output shaft 38 of gear reducer 36 terminates with a spur pinion gear 50 which drives a larger spur gear 52 in a reduction ratio of approximately four to one (4:1). Spur gear 52 in turn is attached to a collar 54 which is rotatable about shaft 56 mounted to mounting support 40 by locking collet 76. Collar 54 in turn is secured to a yoke 58 which at its other end, is attached to a second collar 60 which is also free to rotate about shaft 56.

Also attached to collar 60 are a pair of cams 62 and 64 which in turn respectively control operation of limit switches 66 and 68. The cams are positioned on collar 60 so as to cause limit switch 66 to change state (open to close) when the first arm assembly reaches the home position shown in FIG. 7A, and for limit switch 68 to change state when the lower extended position shown in FIG. 7F is reached; thereby preventing the first arm assembly from making contact with base plate 42.

An encoder 70 is also attached to the terminating end of collar 60 so as to generate information concerning the angular position of collar 60 and thus arm assembly 26. Such information can be used by control apparatus (not shown) which instructs operation of motor 34 and thus the angular position of arm 26.

Again referring to FIG. 2, yoke 58 is attached to the arm 72 of first arm assembly 26, and thus rotation of yoke 58 causes a similar rotation of arm assembly 26 as shown in FIGS. 7A-7F.

As seen in FIG. 2, a bevel gear 78 is rigidly mounted to shaft 56 by means of key 79. This gear mates with a bevel pinion 80 which in turn is secured at one end to rotatable shaft 82 by means of key 85. Shaft 82 is concentrically positioned within arm 72 by means of bearings 84. It is therefore readily seen that angular rotation of first arm assembly 26 as shown in FIGS. 7A-7F causes bevel pinion 80 to rotate about axis 83 as it moves about the periphery of gear 78.

As also seen in FIGS. 2 and 3, the other end of shaft 82 terminates in a second bevel pinion 86 mounted thereto by key 87. Bevel pinion 86 in turn mates with an idler bevel gear 88 mounted to idler shaft 90 by means of key 89. Shaft 90 is rotatably mounted to yokes 92 and 98 by means of bearing 95.

FIGS. 2 and 3 also show that yoke 92 is fixedly attached to arm 72 so that angular rotation of first arm assembly 26 causes the yoke housing to be similarly rotated about shaft 56. Such action is seen in FIGS. 7A-7F.

As seen in FIGS. 3 and 4, a second arm assembly 94 includes arm 96 which pivotally depends from yoke 92. Arm 96 terminates at its upper end with yoke 98 as seen in FIGS. 2 and 3.

Rotatably mounted within arm 96 and forming part of second arm assembly 94 is shaft 102 terminating at its upper end with a bevel pinion 104 mounted thereto by key 105. Bearings 100 allow shaft 102 to freely rotate about axis 103. This bevel pinion mates with idler bevel gear 88 so that rotation of bevel gear 86 imparts rotational movement to idler bevel gear 88, which in turn imparts rotation to bevel gear 104 and thus shaft 102.

As best seen in FIGS. 3 and 4, the other end of shaft 102 terminates with a second bevel pinion 106 by means of key 107. As also seen in FIGS. 3 and 4, arm 96 is mounted to a yoke 108. Within this yoke, bevel pinion 106 meshes with bevel gear 110 which in turn is mounted to shaft 112 by means of key 117. Shaft 112 is rotatably connected to yoke 108 by means of bearings 114. As seen in FIGS. 1, 2 and 4, the platform 30 is secured to hubs 115 by means of mounting screws 116. Hubs 115 are secured to shaft 112 by keys 118 so that rotation of bevel gear 110 imparts angular displacement to hubs 115 and hence to platform 30 with respect to yoke 108.

The bevel gears located at each end of the shafts 82 and 102 have the same number of teeth and consequently, any given angular rotation of first shaft 82 imparts a similar angular rotation to second rotatable shaft 102. The number of teeth associated with idler bevel gear 88 is immaterial with regard to this similar angular rotation of the shafts 82 and 102.

However, in order to insure that a given angular displacement of first arm assembly 28 imparts a similar angular displacement to platform 30, it is necessary that the number of teeth on bevel gear 110 equals the number of teeth on fixed bevel gear 78. Of course if a one to one (1:1) ratio concerning the angular rotation of shaft 82 with regard to shaft 102 is not present due to use of gears at their respective ends not having the same number of teeth, then the number of teeth on bevel gear 110 could be adjusted so as to counteract the increase or decrease of rotation of shaft 102 with regard to shaft 82, so as to maintain a one to one (1:1) relationship between angular movement of bevel gear 110 with respect to angular movement of first arm assembly 26 and thus to bevel gear 78.

It is also apparent in FIG. 3 as well as FIG. 7A-7F that the second arm assembly 94 will maintain a perpendicular orientation with respect to the surface 32 upon which the mobile base is placed unless yoke 98 mechanically contacts yoke 92 as shown in FIGS. 7A-7E at surfaces 93 and 97 respectively. In the preferred embodiment of the present invention, the angle subtended by the first and second arm assemblies when in contact with each other is 60 degrees and thus the first arm assembly can be rotated 150 degrees beyond the base plate datum 111 as shown in FIG. 7E and still be in contact with the second arm assembly. With this angular relationship, the second arm assembly undergoes a similar angular movement as the first arm assembly as shown in FIGS. 7A-7E.

However, it should be noted that although the second arm assembly during such times undergoes an angular movement equal to that of the first arm assembly, platform 30 nevertheless remains parallel with the surface upon which the mobile base is placed due to the fact that bevel pinion 80 continues to rotate about the bevel gear 78 throughout the complete angular movement of the first arm assembly. In this manner, the platform 30 is able to not only maintain a parallel relationship with regard to the surface upon which the mobile base is placed, but can also be extended outward from the mobile base as illustrated in FIGS. 7A-7F, as well as in FIGS. 1, 5 and 6.

FIGS. 2A and 3A show a second embodiment of the present invention wherein platform 30 can be angularly displaced or reoriented with respect to surface 32. In this embodiment, shaft 56 is no longer fixed with respect to base plate 43 via locking collet 76, but rather can be angularly rotated by means of motor 35 and associated worm 37 and gear 45. The motor may be driven as a result of information concerning the inclination of surface 32 upon which the mobile base is placed by means of a damped pendulum inclination sensor 39 associated with an angle encoder and control circuit 41. Thus if the mobile base is traversing a surface which is inclined, this information can be used to drive motor 35 which in turn drives worm 37 and thus gear 45 which controls the angular displacement of shaft 56 and associated gear 78 so as to cause a compensating angular movement to platform 30; thereby maintaining platform 30 level to the earth rather than parallel to the surface upon which the mobile base is traversing.

Motor 35 and associated worm 37 and gear 45 can also be used to adjust the angular position of platform 30 while the arm assemblies are stationary so as to facilitate loading and unloading of objects onto and off of platform 30 such as when loading and unloading pallets and the like.

In this manner, the lifting device not only can maintain a parallel orientation with respect to the surface upon which the mobile base is placed, but alternatively can adjust that position when it is desired to do so.

By maintaining the platform 30 level to the ground rather than to the surface upon which the mobile base is placed, objects can be placed on the platform and maintained level, thereby minimizing slippage off the platform as well as allowing for open vessels containing liquids to be carried without spillage.

It will thus be seen that the object set forth above and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention described, and all statements of the scope of the invention, which, as a matter of language, might be said to fall therebetween.

Having described the invention, what is claimed is:

1. A lifting device (20) for attachment to a base (43) for maintaining a load supported thereby at a fixed orientation relative to the base comprising:
   A) a first shaft (56) fixedly mounted to a base;
   B) a first gear (78) fixedly attached to the shaft;
   C) a first yoke (58) rotatably mounted to the shaft;
   D) a first arm assembly (26) including:
      1) a first arm (72) attached at one end to the first yoke,
      2) a second shaft (82) rotatably mounted to the first arm,
      3) a second gear (80) mounted to a first end of the second shaft and meshed with the first gear so as to rotate the second shaft about its axis when the first arm is angularly displaced about the first gear, and
      4) a third gear (86) mounted at the second end of the second shaft;
   E) a second yoke (92) fixedly attached to the second end of the first arm;
   F) a fourth gear (88) rotatably mounted to the second yoke, the fourth gear meshed with the third gear mounted at the second end of the second shaft;
   G) a second arm assembly (94) including;
      1) a second arm (96) having a longitudinal axis and being movably attached at one end to the second yoke for free pivotal movement relative to the second yoke and the first arm under the influence of gravity thereby permitting the longitudinal axis of the second arm to maintain a vertical orientation, the second arm being pivoted relative to the first arm solely by the influence of gravity,
      2) a third shaft (102) rotatably mounted to the second arm,
      3) a fifth gear (104) mounted to a first end of the third shaft and meshed with the fourth gear, and
      4) a sixth gear (106) mounted at the second end of the third shaft;
   H) a third yoke (108) attached to the second end of the second arm;
   I) a seventh gear (110) rotatably mounted to the third yoke, the seventh gear meshed with the sixth gear mounted at the second end of the third shaft;
   J) a platform (30) for supporting a load;
   K) means (112, 114, 115, 116) for interconnecting the platform to the seventh gear; and
   L) means (34, 36, 50, 52) for angularly rotating the first yoke and thus the first arm about the first shaft mounted to the base;
whereby angular movement of the first arm assembly imparts equal angular movement to the platform with respect to the second arm assembly so that the platform maintains a fixed orientation to the base.

2. A lifting device as defined in claim 1, wherein the multiplicative gear ratio between the first and second gears, the third and fifth gears and the sixth and seventh gears is one to one (1:1), so that the angular movement of the platform with respect to the second arm assembly is equal to the angular movement of the first arm assembly to the first gear.

3. A lifting device as defined in claim 2, wherein the first and second arms of the first and second arm assemblies contact each other when the angle between the first and second arm assemblies is equal to a predetermined value.

4. A lifting device as defined in claim 3, wherein the first arm of the first arm assembly is tubular in configuration and concentric about the second shaft and the second arm of the second arm assembly is a tubular in configuration and concentric about the third shaft.

5. A lifting device as defined in claim 4, further including means for preventing angular movement of the first arm assembly about the first gear when the first arm assembly angular displacement equals a first or second value.

6. A lifting device as defined in claim 5, wherein the means for preventing angular movement of the first arm assembly includes cams secured to the first yoke and limit switches cooperatively engaged with the cams so as to change state when the first or second angular values of the first arm assembly are obtained.

7. A lifting device as defined in claim 6, wherein the means for angularly displacing the first arm assembly includes a motor, a gear reducer rotatably driven by the motor, an eighth gear driven by the output of the gear reducer, and a ninth gear secured to the first yoke and meshed with the eighth gear at the output of the gear reducer so as to be driven thereby.

8. A lifting device for attachment to a base for maintaining a load supported thereby at a fixed orientation relative to the base comprising:
   A) a first gear having means mounting said first gear fixedly to a base;
   B) a first arm assembly including;
      1) a first arm,
      2) a first shaft rotatably mounted to the first arm,
      3) a second gear mounted to a first end of the first shaft and meshed with the first gear so as to rotate the first shaft about its axis when the first arm is angularly displaced about the first gear, and
      4) a third gear mounted at the second end of the first shaft;
   C) means for rotatably mounting the first arm assembly to the first gear and means for angularly displacing the first arm assembly about the first gear;
   D) a second arm assembly including;
      1) a second arm having a longitudinal axis,
      2) a second shaft rotatably mounted to the second arm,
      3) a fourth gear mounted to a first end of the second shaft, and
      4) a fifth gear mounted at the second end of the second shaft;
   E) means for allowing the second arm to pivot freely under the influence of gravity with respect to the first arm when the angle subtended between the first and second is greater than a first angular value thereby permitting the longitudinal axis of the second arm to maintain a vertical orientation, the second arm being pivoted relative to the first arm solely by the influence of gravity said means including means for imparting the angular rotation of the third gear to the fourth gear;
   F) a platform for supporting a load; and
   G) means for pivotally attaching the platform to the second end of the second arm assembly, said means including means for converting angular rotation of the fifth gear into angular movement of the platform with respect to the second arm assembly;

whereby angular movement of the first arm assembly about the first gear imparts angular movement to the platform with respect to the second arm assembly so that the platform maintains a fixed orientation to the base.

9. A lifting device (20) for attachment to a base (43) comprising:
A) a first shaft (56) rotatably mounted to a base;
B) a first gear (78) fixedly attached to the shaft;
C) a first yoke (58) rotatably mounted to the shaft;
D) a first arm assembly (26) including:
  1) a first arm (72) attached at one end to the first yoke,
  2) a second shaft (82) rotatably mounted to the first arm,
  3) a second gear (80) mounted to a first end of the second shaft and meshed with the first gear so as to rotate the second shaft about its axis when the first arm is angularly displaced about the first gear, and
  4) a third gear (86) mounted at the second end of the second shaft;
E) a second yoke (92) fixedly attached to the second end of the first arm;
F) a fourth gear (88) rotatably mounted to the second yoke, the fourth gear meshed with the third gear mounted at the second end of the second shaft;
G) a second arm assembly (94) including;
  1) a second arm (96) having a longitudinal axis and being movably attached at one end to the second yoke for free pivotal movement relative to the second yoke and the first arm under the influence of gravity thereby permitting the longitudinal axis of the second arm to maintain a vertical orientation, the second arm being pivoted relative to the first arm solely by the influence of gravity
  2) a third shaft (102) rotatably mounted to the second arm,
  3) a fifth gear (104) mounted to a first end of the third shaft and meshed with the fourth gear, and
  4) a sixth gear (106) mounted at the second end of the third shaft;
H) a third yoke (108) attached to the second end of the second arm;
I) a seventh gear (110) rotatably mounted to the third yoke, the seventh gear meshed with the sixth gear mounted at the second end of the third shaft;
J) a platform (30) for supporting a load;
K) means (112, 114, 115, 116) for interconnecting the platform to the seventh gear;
L) means (34, 36, 50, 52) for angularly rotating the first yoke and thus the first arm about the first shaft mounted to the base, whereby angular movement of the first arm assembly imparts angular movement to the platform with respect to the second arm assembly proportional to the angular movement of the first arm assembly about the first shaft mountable to the base; and
M) means for angularly rotating the first shaft and the first gear thereon with respect to the base; whereby the angular orientation of the platform with respect to the base is adjustable independent of angular displacement of the first and second arm assemblies.

10. A lifting device as defined in claim 9, wherein the means for angularly rotating the first shaft with respect to the base comprises means for determining the inclination of the base with respect to the earth so that changes in said inclination cause said means for rotating the first shaft to impart a proportional rotation to the first shaft; whereby the platform orientation can be adjusted as the inclination of the base varies with respect to the earth.

11. A lifting device for attachment to a base comprising:
A) a first gear having means rotatably mounting said first gear to a base;
B) a first assembly including:
  1) a first arm,
  2) a first shaft rotatably mounted to the first arm,
  3) a second gear mounted to a first end of the first shaft and meshed with the first gear so as to rotate the first shaft about its axis when the first arm is angularly displaced about the first gear, and
  4) a third gear mounted at the second end of the first shaft;
C) means for rotatably mounting the first arm assembly to the first gear and means for angularly displacing the first arm assembly about said first gear;
D) a second arm assembly including:
  1) a second arm,
  2) a second shaft rotatably mounted to the second arm having a longitudinal axis,
  3) a fourth gear mounted to a first end of the second shaft, and
  4) a fifth gear mounted at the second end of the second shaft;
E) means for allowing the second arm to pivot freely under the influence of gravity with respect to the first arm when the angle subtended between the first and second arms is greater than a first angular value thereby permitting the longitudinal axis of the second arm to maintain a vertical orientation, the second arm being pivoted relative to the first arm solely by the influence of gravity, said means including means for imparting the angular rotation of the third gear to the fourth gear;
F) a platform for supporting a load;
G) means for pivotally attaching the platform to the second end of the second arm assembly, said means including means for converting angular rotation of the fifth gear into angular movement of the platform with respect to the second arm assembly; whereby angular movement of the first arm assembly about the first gear imparts angular movement to the platform with respect to the second arm assembly proportional to the angular movement of the first arm assembly about the first gear; and
H) means for turning the first gear with respect to the base so that the angular orientation of the platform with respect to the base can be altered independent of angular displacement of the first arm assembly about the first gear.

12. A lifting device as defined in claim 11, further comprising means for determining the inclination of the base with respect to the earth, said inclination determining means interfaced to the means for turning the first gear with respect to the base so as to cause the first gear to turn as the inclination of the base changes; whereby the inclination of the platform is adjustable with respect to the base if the inclination of the base changes.

13. A lifting device as defined in claim 12, wherein the means for turning the first gear with respect to the base is proportional to the change in inclination of the base in an amount sufficient to maintain the orientation of the platform fixed with respect to the earth.

14. A lifting device (20) for attachment to a base (43) comprising:
A) a first shaft (56) mounted to a base;
B) a first gear (78) fixedly attached to the shaft;
C) a first yoke (58) rotatably mounted to the shaft;
D) a first arm assembly (26) including:
 1) a first arm (72) attached at one end to the first yoke,
 2) a second shaft (82) rotatably mounted to the first arm,
 3) a second gear (80) mounted to a first end of the second shaft and meshed with the first gear so as to rotate the second shaft about its axis when the first arm is angularly displaced about the first gear, and
 4) a third gear (86) mounted at the second end of the second shaft;
E) a second yoke (92) fixedly attached to the second end of the first arm;
F) a fourth gear (88) rotatably mounted to the second yoke, the fourth gear meshed with the third gear mounted at the second end of the second shaft;
G) a second arm assembly (94) including;
 1) a second arm (96) having a longitudinal axis and being movably attached at one end to the second yoke for free pivotal movement relative to the second yoke and the first arm under the influence of gravity thereby permitting the longitudinal axis of the second arm to maintain a vertical orientation, the second arm being pivoted relative to the first arm solely by the influence of gravity,
 2) a third shaft (102) rotatably mounted to the second arm,
 3) a fifth gear (104) mounted to a first end of the third shaft and meshed with the fourth gear, and
 4) a sixth gear (106) mounted at the second end of the third shaft;
H) a third yoke (108) attached to the second end of the second arm;
I) a seventh gear (110) rotatably mounted to the third yoke, the seventh gear meshed with the sixth gear mounted at the second end of the third shaft;
J) a platform (30) for supporting a load;
K) means (112, 114, 115, 116) for interconnecting the platform to the seventh gear; and
L) (34, 36, 50, 52) for angularly rotating the first yoke and thus the first arm about the first shaft mounted to the base, whereby angular movement of the first arm assembly imparts angular movement to the platform with respect to the second arm assembly proportional to the angular movement of the first arm assembly about the first shaft mountable to the base.

15. A lifting device for attachment to a base comprising:
A) a first gear having means mounting said first gear to a base;
B) a first assembly including:
 1) a first arm,
 2) a first shaft rotatably mounted to the first arm,
 3) a second gear mounted to a first end of the first shaft and meshed with the first gear so as to rotate the first shaft about its axis when the first arm is angularly displaced about the first gear, and
 4) a third gear mounted at the second end of the first shaft;
C) means for rotatably mounting the first arm assembly to the first gear and means for angularly displacing the first arm assembly about said first gear;
D) a second arm assembly including:
 1) a second arm having a longitudinal axis,
 2) a second shaft rotatably mounted to the second arm,
 3) a fourth gear mounted to a first end of the second shaft, and
 4) a fifth gear mounted at the second end of the second shaft;
E) means for allowing the second arm to pivot freely under the influence of gravity with respect to the first arm when the angle subtended between the first and second is greater than a first angular value thereby permitting the longitudinal axis of the second arm to maintain a vertical orientation, the second arm being pivoted relative to the first arm solely by the influence of gravity, said means including means for imparting the angular rotation of the third gear to the fourth gear;
F) a platform for supporting a load; and
G) means for pivotally attaching the platform to the second end of the second arm assembly, said means including means for converting angular rotation of the fifth gear into angular movement of the platform with respect to the second arm assembly; whereby angular movement of the first arm assembly about the first gear imparts angular movement to the platform with respect to the second arm assembly proportional to the angular movement of the first arm assembly about the first gear.

* * * * *